No. 851,310. PATENTED APR. 23, 1907.
W. F. OVERMYER.
GIN.
APPLICATION FILED JUNE 19, 1906.
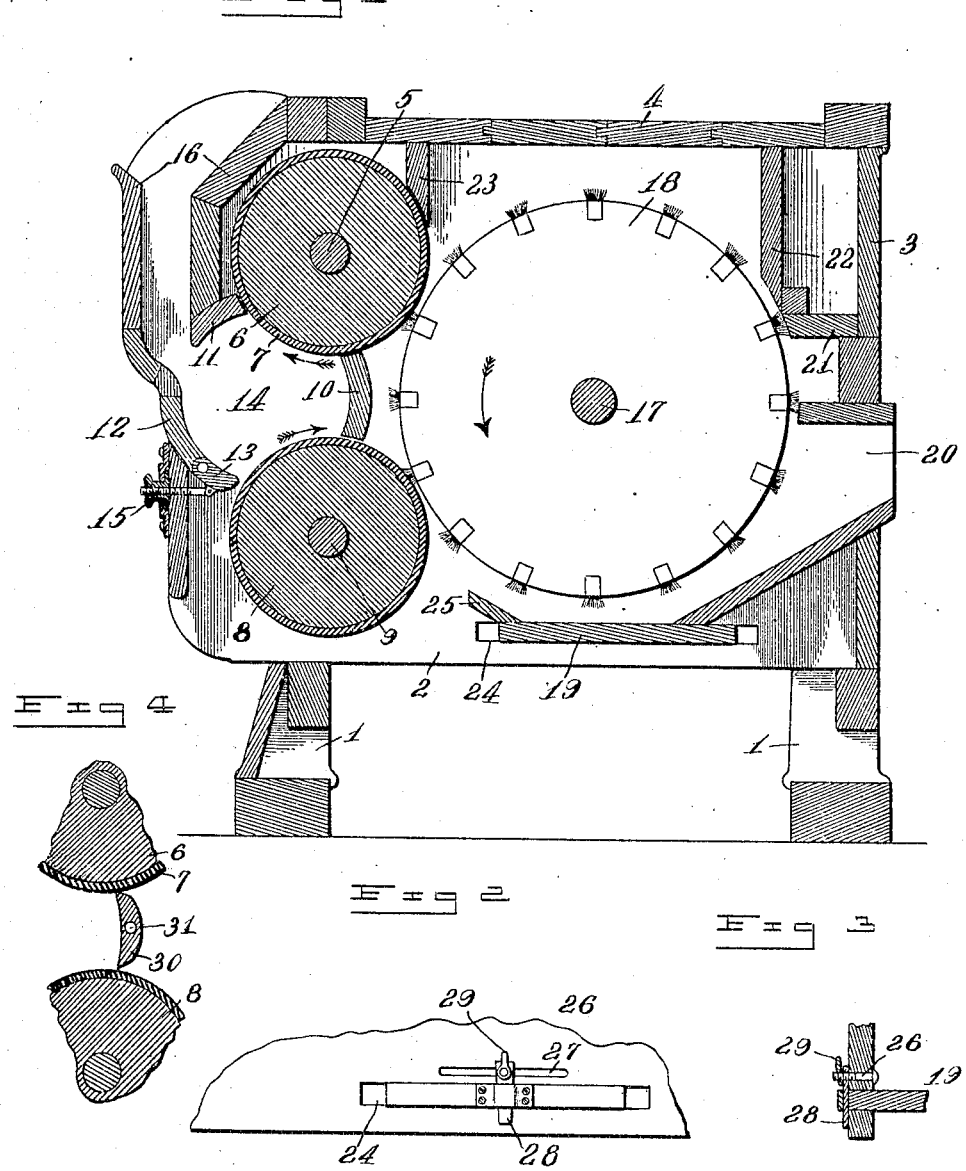
Inventor
William F. Overmyer
Witnesses
H. A. Robinette.
G. Aurro
By Edward M. Weeks.
Attorney

UNITED STATES PATENT OFFICE.

WILLIAM F. OVERMYER, OF BEECHWOOD, MISSISSIPPI.

GIN.

No. 851,310.      Specification of Letters Patent.      Patented April 23, 1907.

Application filed June 19, 1906. Serial No. 322,366.

*To all whom it may concern:*

Be it known that I, WILLIAM F. OVERMYER, a citizen of the United States, residing at Beechwood, in the county of Amite and State of Mississippi, have invented certain new and useful Improvements in Gins, of which the following is a specification.

My invention relates to an improvement in gins, and it consists in the constructions, combinations and arrangements herein described and claimed.

An object of my invention is to provide an improved gin having an increased capacity, and constructed to prevent lumping of the cotton in the gin and to reduce lumps existing in the seed cotton fed thereto.

A further object of my invention is to provide a gin capable of efficient operation on all characters and grades of seed cotton and especially adapted for ginning high grades of long staple and sea island cotton without damaging the staple.

In the accompanying drawings, forming a part of this application and in which similar reference symbols indicate corresponding parts in the several views: Figure 1 is a central, vertical sectional view, illustrating one embodiment of my invention; Fig. 2 is a detail side elevation illustrating means for adjusting the mote board; Fig. 3 is a detail sectional view, on the line 3—3 of Fig. 2, and Fig 4 is a detail sectional view, illustrating a slight modification in which the knife, or scraper, of the gin roll is adjustably mounted.

Referring to the drawings, 1 indicates suitable supports for a casing comprising side walls 2, a rear wall 3 and a top 4. A shaft 5, journaled in the casing, carries an upper gin roll 6 having its periphery 7 formed in the usual manner, of leather, composition, or constituting a hard brush. A similar lower gin roll 8 is carried by a shaft 9 journaled in the casing.

I have illustrated the upper roll 6 located directly above the lower roll 8, but, under certain conditions, the upper roll could be advantageously positioned slightly in the rear of the position shown. This modified construction would permit the feeding of material near the top of the roll chamber, thereby preventing the contents of the roll chamber from being thrown into the feed hopper by the centrifugal force of the revolving seed cotton roll.

A knife, or scraper, 10, extending between the two gin rolls, is suitably spaced from the lower roll 8 to permit the cotton lint to be carried thereby while preventing the passage of cotton seed; said knife acts also as a baffle for preventing escape of dirt from the roll chamber. A knife, or scraper, 11 is similarly spaced from the upper gin roll 6 to permit passage of the cotton lint while excluding cotton seed.

A breast board 12 and seed board 13 cooperate with the scraper 10 to provide a roll chamber 14, in which the seed cotton is balled, or rolled, by the action of the gin rolls; the seed board 13 being shown provided with an adjusting screw 15.

A feed hopper 16 is constructed to deliver seed cotton downwardly to the side of the roll chamber 14 opposite to the gin rolls, which latter are rotated in the direction indicated by arrows in Fig. 1 of the drawings. By thus introducing the seed cotton at the side of the roll chamber, the action of feeding the cotton cooperates with the feed rolls in producing and maintaining a rolling movement of the cotton in the roll chamber. This construction enables the cotton to be drawn freely into the roll chamber from the feed hopper, and obviates all danger of lumps being formed in the roll chamber by the action of the entering cotton fed thereto; thereby securing a uniform feed and preventing packing and lumping of the cotton in the roll chamber A suitable journal shaft 17 carries a brush cylinder 18 for removing the lint from the two gin rolls and discharging it against a mote board 19 and through a lint flue 20; baffle plates, or wind guards, 21, 22, and 23 being arranged in proximity to the periphery of the brush cylinder. The mote board 19 is adjustably supported in guide slots 24 in the sides 2 of the casing, and carries a deflector 25 for separating heavier impurities, such as dirt, sand etc., from the lint prior to its discharge into the lint flue. This construction permits adjustment of the deflector 25 to produce an efficient separation of heavier impurities from the lint for all characters and grades of cotton. I have shown a bolt 26 extending through a slot 27 in the casing side and through a plate 28 on the mote board for permitting adjustment of the latter; a hand nut 29 being provided for clamping the bolt in the several adjusted positions of the mote board.

In the operation of my invention, seed cotton is fed through the hopper 16, and the gin rolls 6 and 8 strip the lint from the cotton seeds in the roll chamber 14 and carry it past the scrapers 10 and 11 to the brush cylinder 18. The brush cylinder gathers the lint from the rolls in the usual manner and discharges it against the mote board and into the lint flue 20; the rapid motion of the brush cylinder acting to produce a current across the mote board and through the lint flue. During such discharge of the lint from the brush cylinder, all heavy impurities intermixed with the lint will be deflected downwardly by the adjustable deflector 25, thus separating them from the lighter lint, which will be drawn by the air current across the upper surface of such deflector and discharged into the lint flue. The cotton seeds, after being delinted are discharged from the roll chamber past the edge of the seed board 13, and such seed board can be conveniently adjusted to meet various operating conditions.

Fig. 4 illustrates a slight modifications, in which the knife, or scraper, 30 of the gin roll is secured to a rotatable shaft 31 for adjusting it relative to said roll. This construction enables the knife to be adjusted to compensate for wear, or to adapt it for different characters of material.

I have illustrated and described a preferred and satisfactory construction, but, obviously, changes could be made within the spirit and scope of my invention.

Having thus described my invention, what I claim as new and desire to secure by Letters Patent, is:—

1. In an apparatus of the character described, the combination of a roll chamber, a pair of gin rolls extending within said roll chamber at one side thereof, means for rotating one of said rolls to produce a backward and upward movement of the portion extending within the roll chamber, means for rotating the other of said rolls to produce a forward and upward movement of the portion extending within the roll chamber and feeding means for delivering seed cotton downwardly in the side of the roll chamber opposite the said gin rolls, substantially as described.

2. In an apparatus of the character described, the combination of a roll chamber, a pair of gin rolls extending within said roll chamber at one side thereof, means for rotating one of said rolls to produce a backward and upward movement of the portion extending within the roll chamber, means for rotating the other of said rolls to produce a forward and upward movement of the portion extending within the roll chamber, feeding means for delivering seed cotton downwardly in the side of the roll chamber opposite said gin rolls, a seed board in the bottom of said chamber, and means for adjusting said seed board relatively to one of said gin rolls.

3. In an apparatus of the character described, the combination of two gin rolls, an adjustable scraper extending between said two gin rolls, and means for adjusting said scraper relative to said rolls, substantially as described.

4. In an apparatus of the character described, the combination of two gin rolls, a rotatably-mounted scraper extending between said two gin rolls, and means for swinging said rotatably-mounted scraper for adjusting it relative to said two rolls, substantially as described.

In testimony whereof I affix my signature in presence of two witnesses.

WILLIAM F. OVERMYER.

Witnesses:
   R. S. STEWART,
   O. J. CAUSEY.